(12) United States Patent
Cheon

(10) Patent No.: US 12,252,116 B2
(45) Date of Patent: Mar. 18, 2025

(54) DRIVER ASSISTANCE SYSTEM AND DRIVER ASSISTANCE METHOD

(71) Applicant: HL Klemove Corp., Incheon (KR)

(72) Inventor: Seunghun Cheon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 287 days.

(21) Appl. No.: 17/975,824

(22) Filed: Oct. 28, 2022

(65) Prior Publication Data

US 2023/0140246 A1 May 4, 2023

(30) Foreign Application Priority Data

Oct. 28, 2021 (KR) .................. 10-2021-0145912

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2050/146* (2013.01); *B60W 2420/40* (2013.01); *B60W 2420/408* (2024.01); *B60W 2554/4029* (2020.02)

(58) Field of Classification Search
CPC .............. B60W 30/09; B60W 50/14; B60W 2050/146; B60W 2420/40; B60W 2420/408; B60W 2554/4029; B60W 2420/403; B60W 30/0956; B60W 2520/10; B60W 40/02; B60W 10/18; B60W 2050/143; B60W 2552/30; G01S 13/867; G01S 7/41; G01S 13/931
See application file for complete search history.

(56) References Cited

U.S. PATENT DOCUMENTS

| | | | |
|---|---|---|---|
| 7,667,581 B2 * | 2/2010 | Fujimoto | G06V 20/588 340/436 |
| 9,336,436 B1 * | 5/2016 | Dowdall | B60W 60/0027 |
| 9,505,412 B2 * | 11/2016 | Bai | B60Q 1/525 |
| 10,281,920 B2 * | 5/2019 | Frazzoli | G05D 1/0219 |
| 10,906,559 B1 * | 2/2021 | Cheon | G06V 20/588 |
| 11,377,103 B2 * | 7/2022 | Okabe | G06V 20/56 |
| 2009/0303026 A1 * | 12/2009 | Broggi | G01S 17/931 340/435 |
| 2011/0246156 A1 * | 10/2011 | Zecha | G06V 40/23 703/6 |

(Continued)

FOREIGN PATENT DOCUMENTS

| | | |
|---|---|---|
| JP | 2012079116 A | 4/2012 |
| JP | 6860763 B2 | 4/2021 |

(Continued)

*Primary Examiner* — Mussa A Shaawat
(74) *Attorney, Agent, or Firm* — Harvest IP Law, LLP

(57) ABSTRACT

A driver assistance system includes: an infrared camera provided in a vehicle and configured to acquire infrared image data; a radar sensor provided in the vehicle and configured to acquire radar data; and a controller configured to process at least one of the infrared image data or the radar data, wherein the controller is configured to: identify a target object approaching in a lateral direction from an outside of a driving lane of the vehicle, based on at least one of the infrared image data or the radar data; and perform a collision avoidance control based on a similarity between the target object and a pedestrian.

22 Claims, 13 Drawing Sheets

(56) References Cited

U.S. PATENT DOCUMENTS

| | | | | |
|---|---|---|---|---|
| 2011/0255741 A1* | 10/2011 | Jung | ...................... | G06V 20/58 |
| | | | | 382/103 |
| 2013/0329960 A1* | 12/2013 | Sandahl | ................. | G06V 20/56 |
| | | | | 382/104 |
| 2014/0324330 A1* | 10/2014 | Minemura | ............. | G08G 1/166 |
| | | | | 701/300 |
| 2015/0206001 A1* | 7/2015 | Maurer | ................... | G06F 18/24 |
| | | | | 382/103 |
| 2016/0042645 A1* | 2/2016 | Harada | ............. | B60W 30/0956 |
| | | | | 701/117 |
| 2017/0097411 A1* | 4/2017 | Levi | ........................ | G01S 13/58 |
| 2017/0262750 A1* | 9/2017 | Kozuka | ................. | G06V 20/58 |
| 2017/0327094 A1* | 11/2017 | Inoue | ...................... | B60W 30/09 |
| 2018/0162393 A1* | 6/2018 | Lee | ..................... | B60T 8/17558 |
| 2018/0218227 A1* | 8/2018 | Takaki | .............. | B60W 30/0956 |
| 2018/0259968 A1* | 9/2018 | Frazzoli | ................. | G06V 20/58 |
| 2018/0362028 A1* | 12/2018 | Prokhorov | ......... | B62D 15/0255 |
| 2018/0370502 A1* | 12/2018 | Wang | ..................... | B60T 8/174 |
| 2019/0291728 A1* | 9/2019 | Shalev-Shwartz | .......................... | |
| | | | | B60W 50/0097 |
| 2019/0369626 A1* | 12/2019 | Lui | ...................... | G05D 1/0221 |
| 2019/0377354 A1* | 12/2019 | Shalev-Shwartz | ....... | G08G 1/16 |
| 2021/0024063 A1* | 1/2021 | Luo | ..................... | B60W 30/095 |
| 2023/0001919 A1* | 1/2023 | Hazama | ................ | B60W 30/09 |

FOREIGN PATENT DOCUMENTS

| | | |
|---|---|---|
| KR | 10-1489836 B1 | 2/2015 |
| KR | 10-2017-0119059 A | 10/2017 |
| KR | 20210088780 A | 7/2021 |

\* cited by examiner

[FIG. 1]
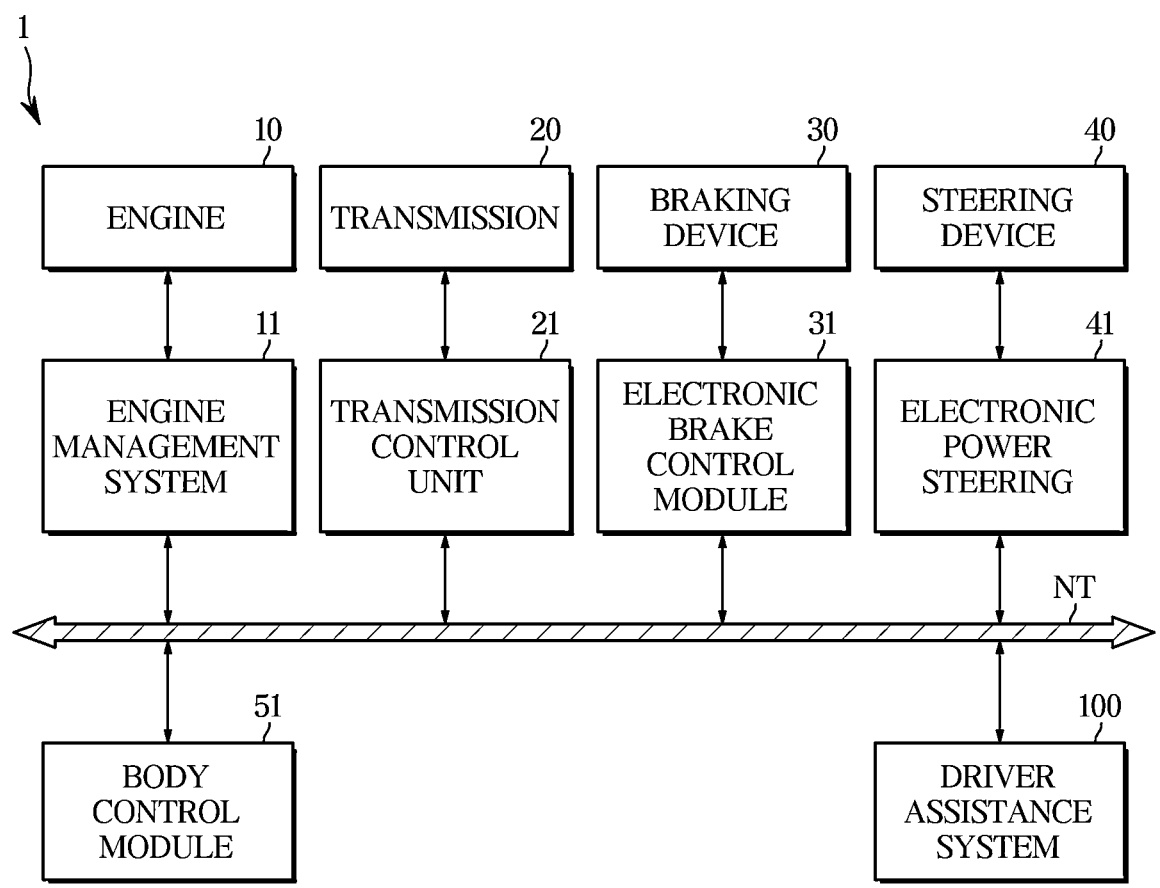

[FIG. 2]
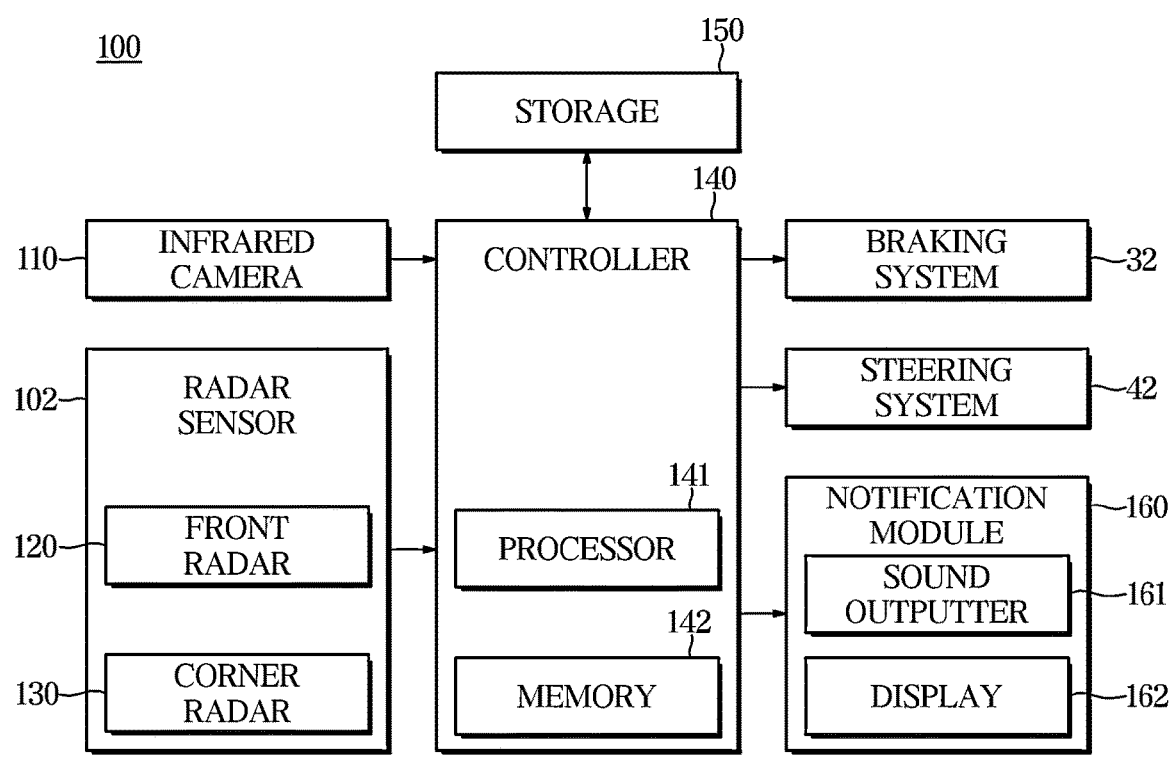

[FIG. 3]
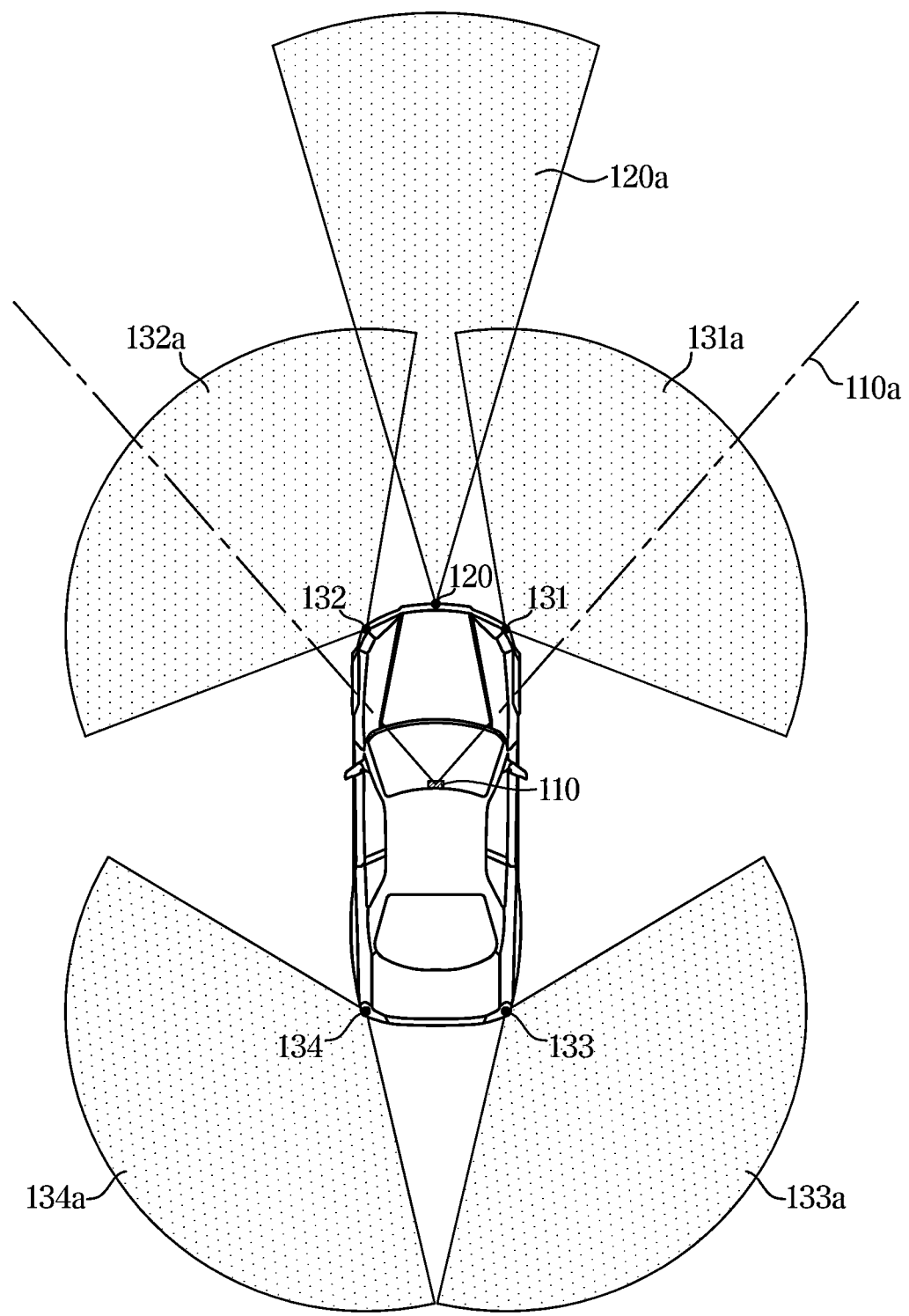

[FIG. 4A]
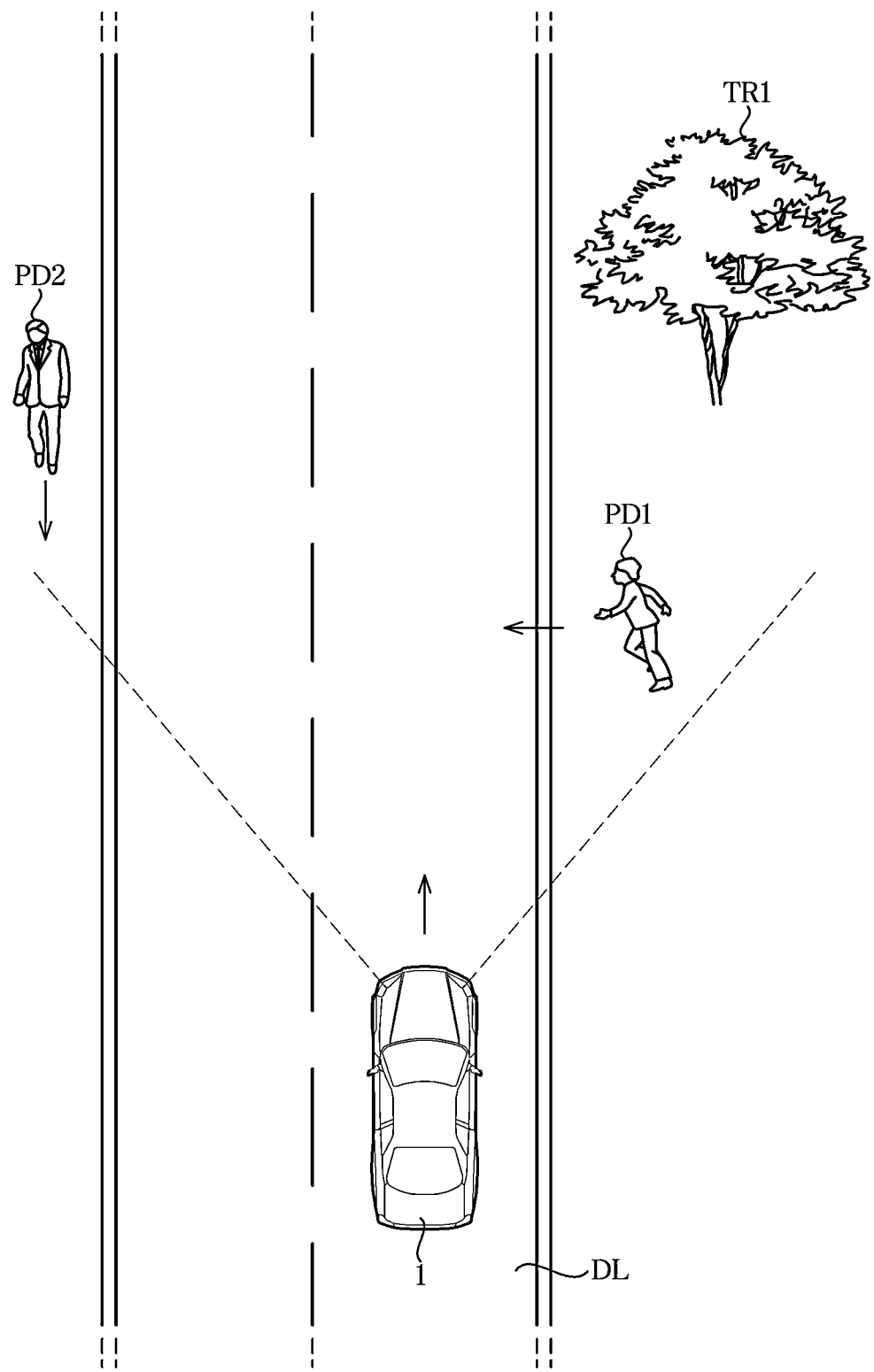

[FIG. 4B]
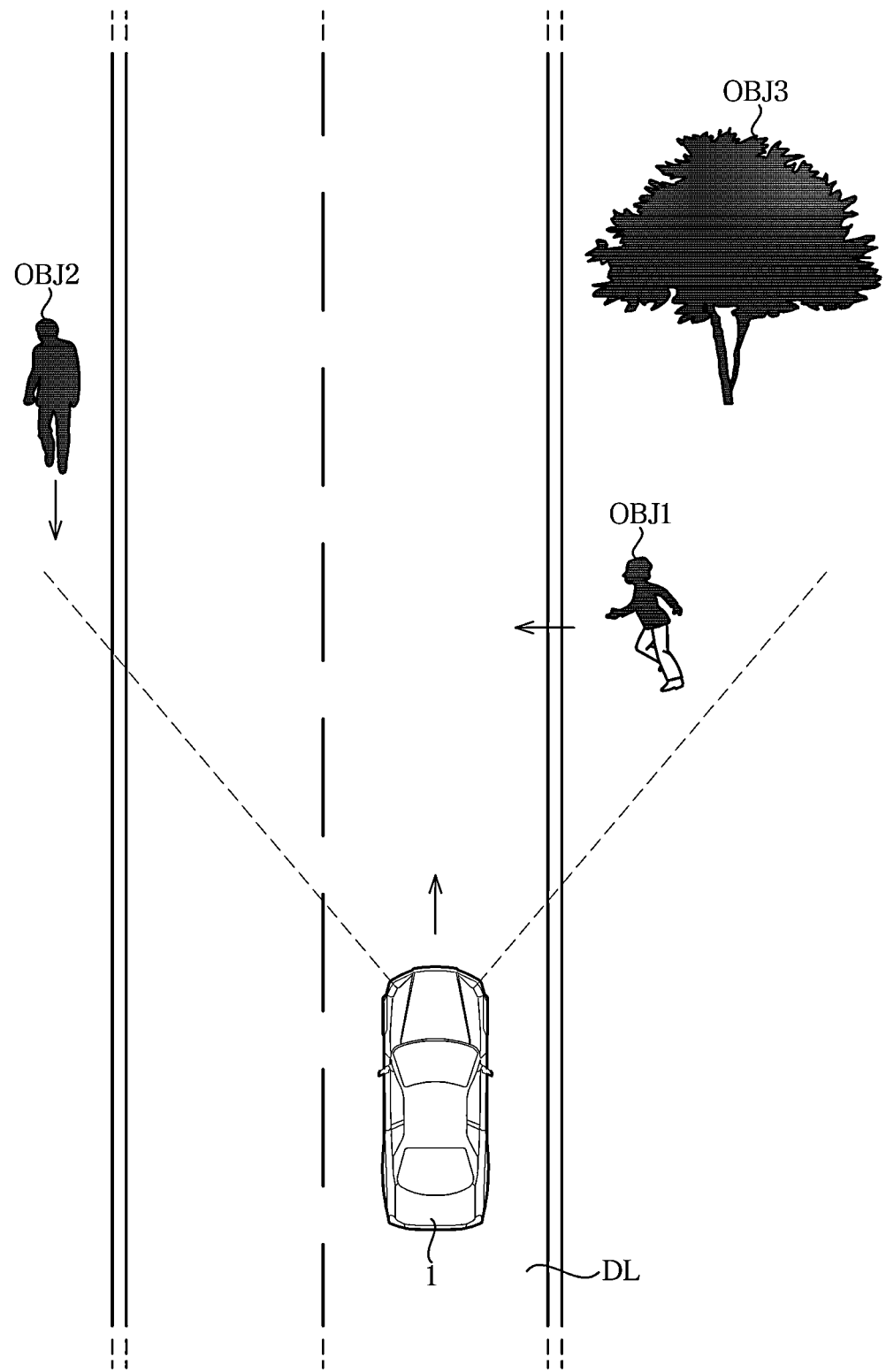

[FIG. 5]
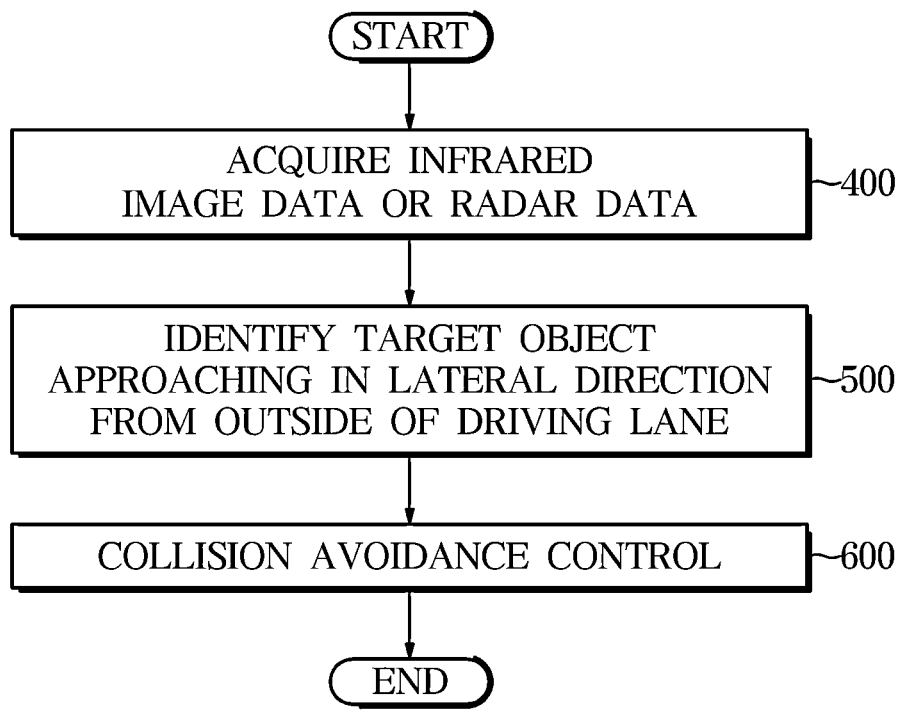

[FIG. 6]
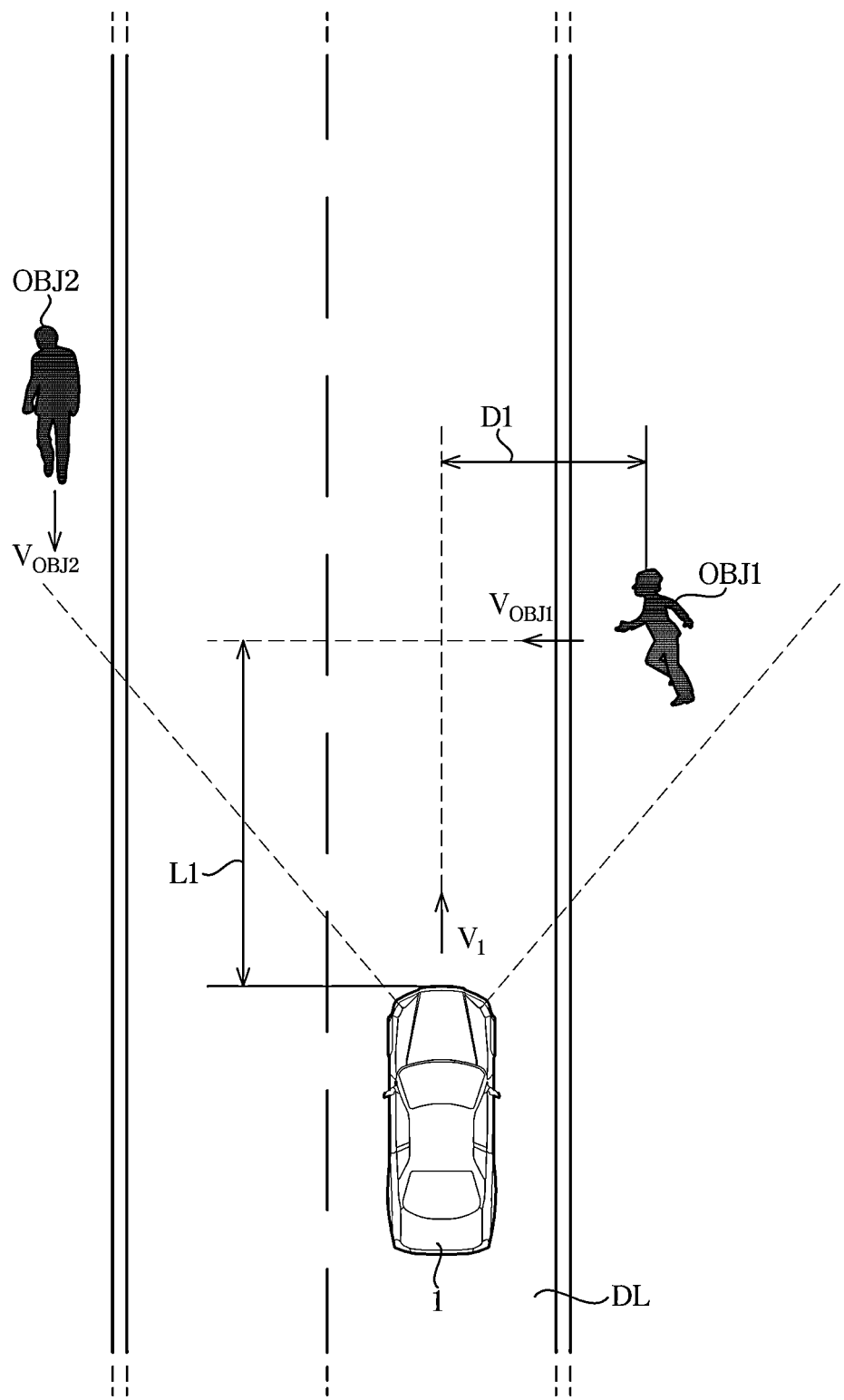

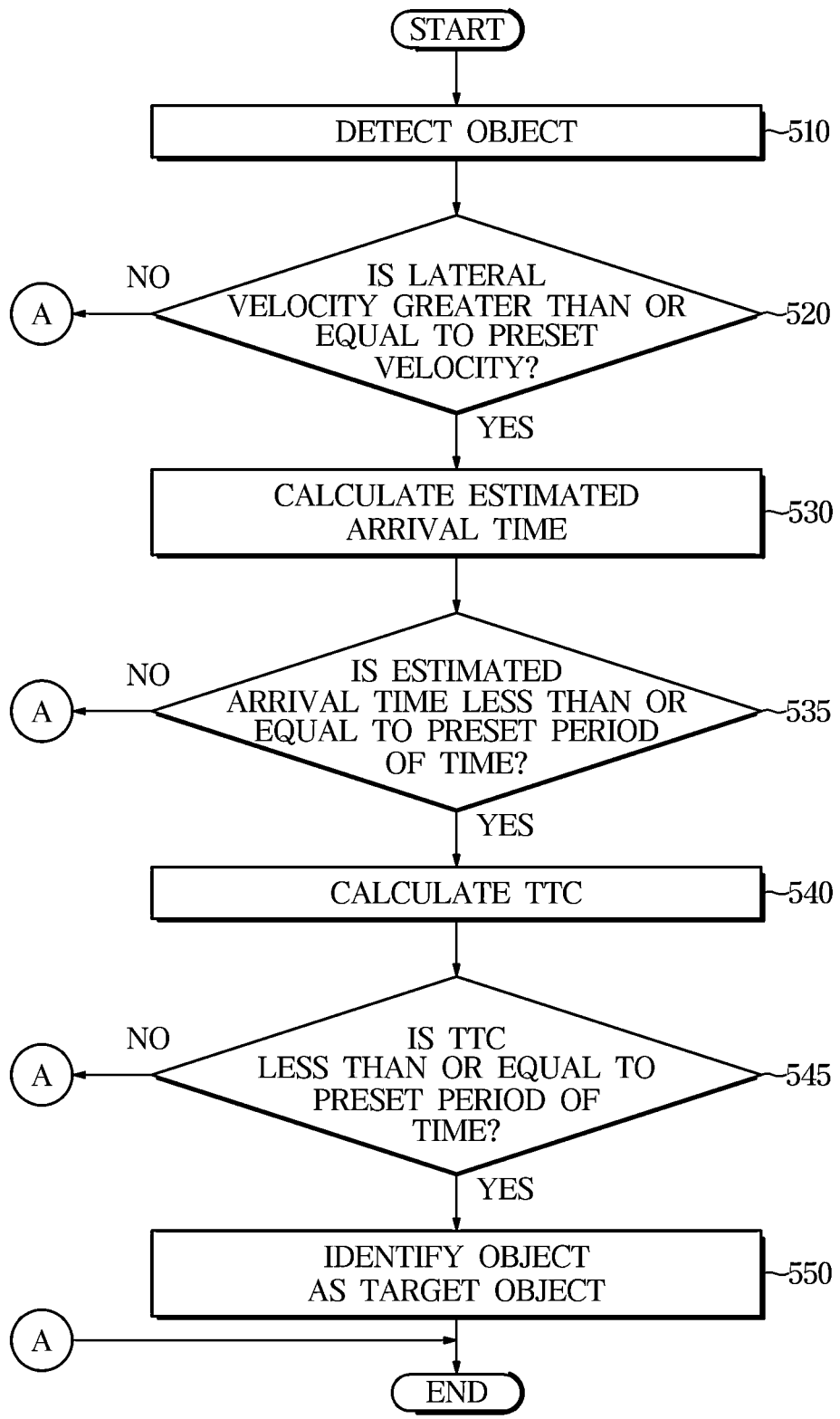

[FIG. 8A]
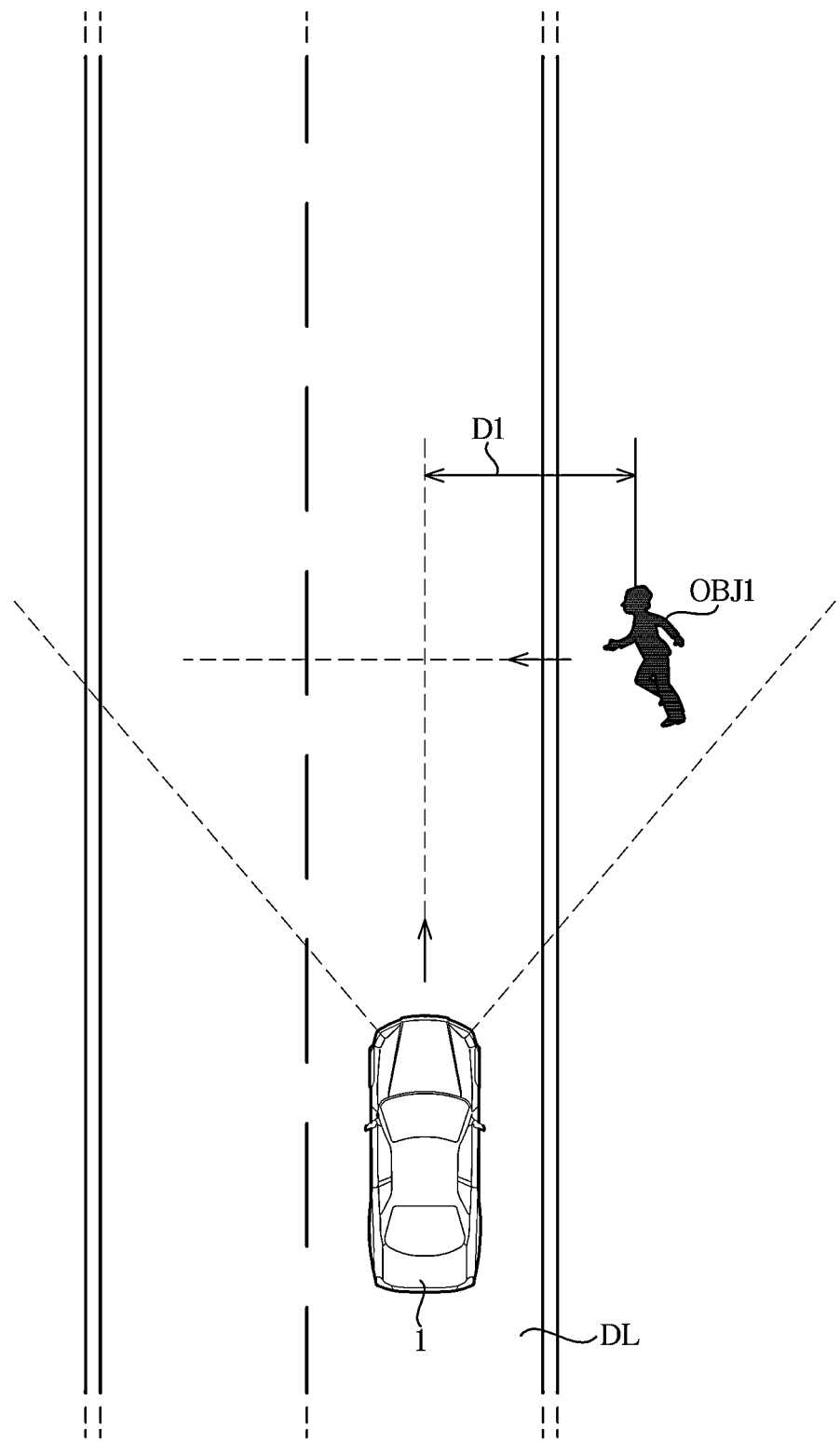

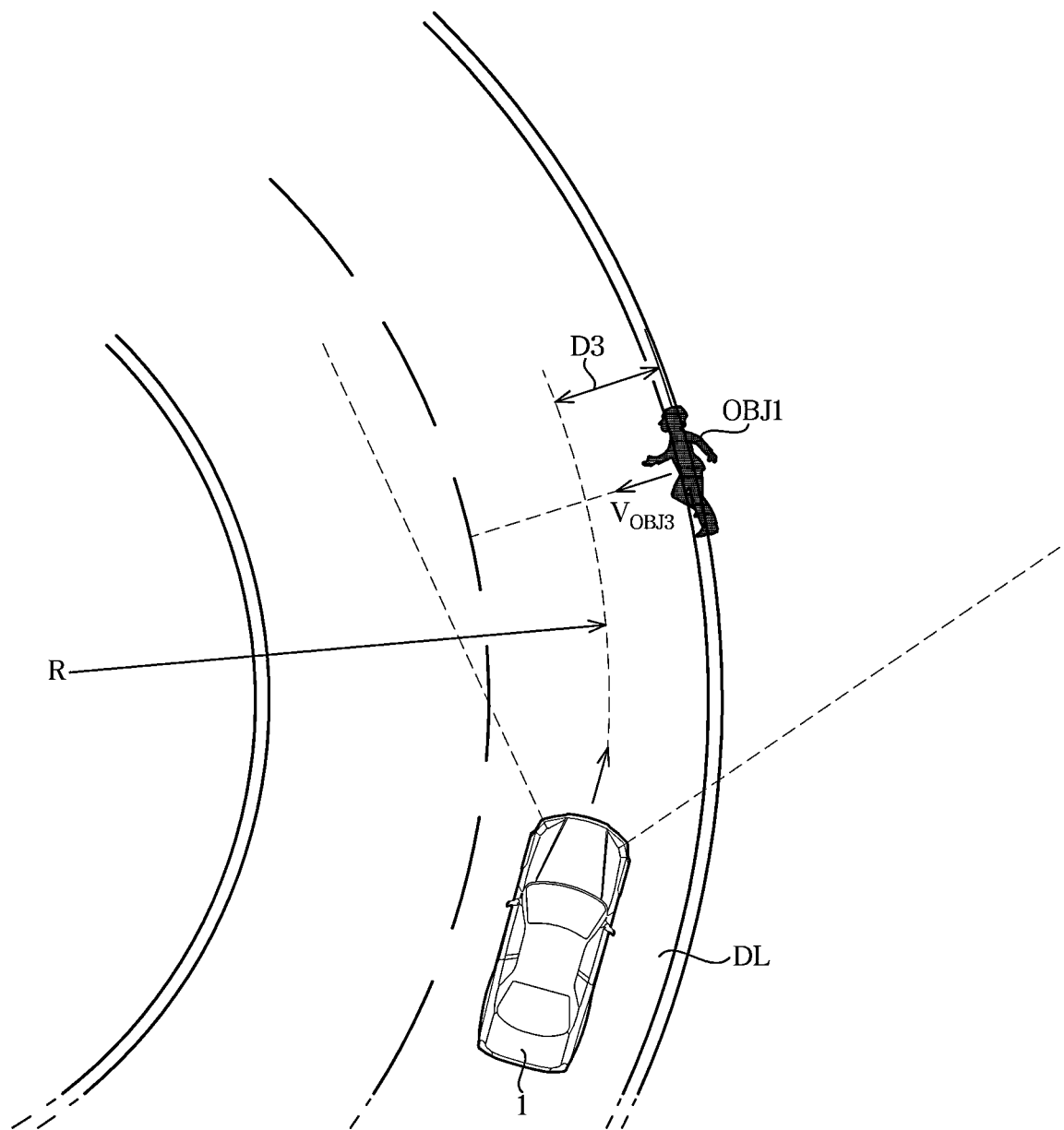
[FIG. 8B]

[FIG. 9]
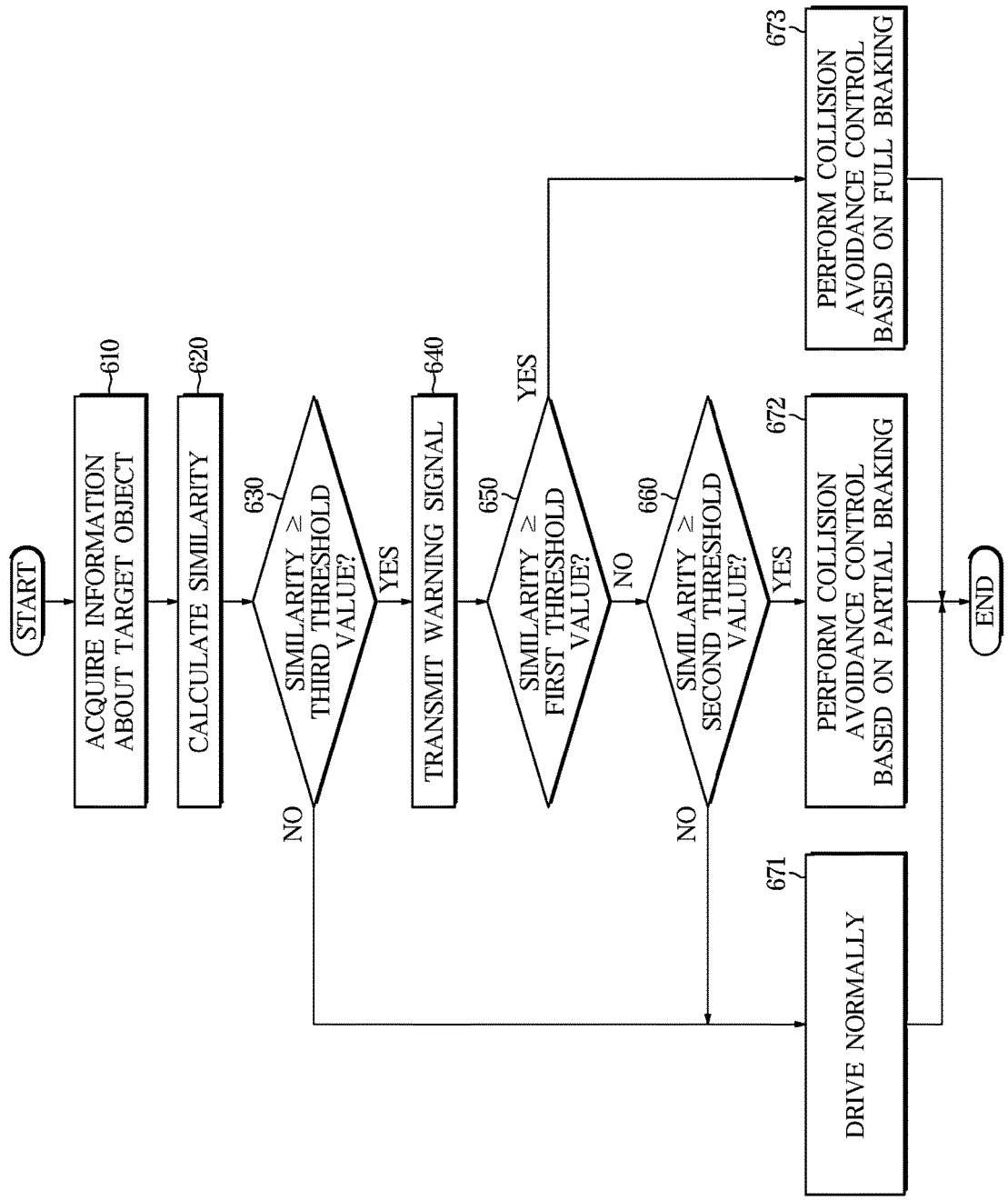

[FIG. 10A]
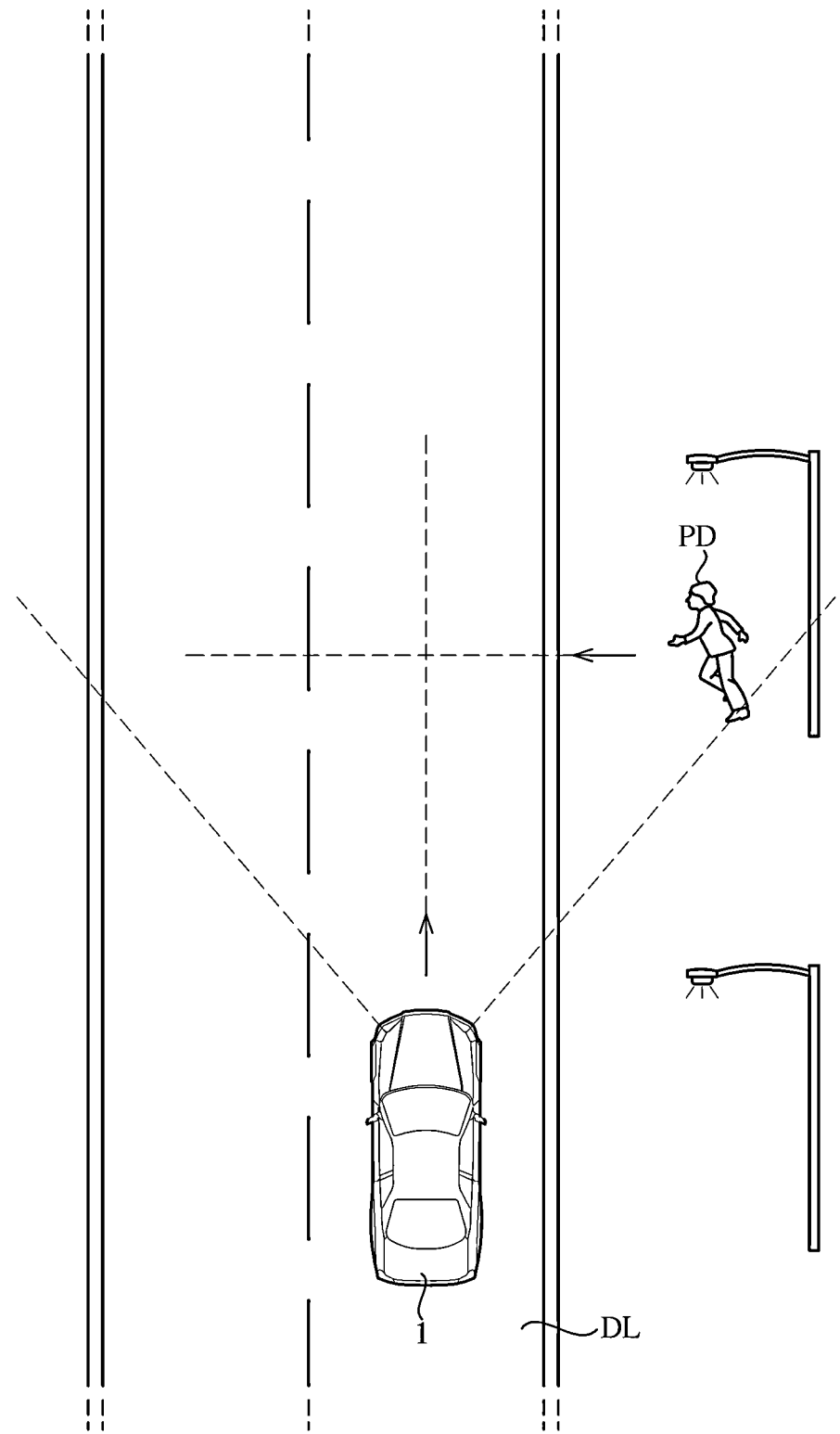

[FIG. 10B]
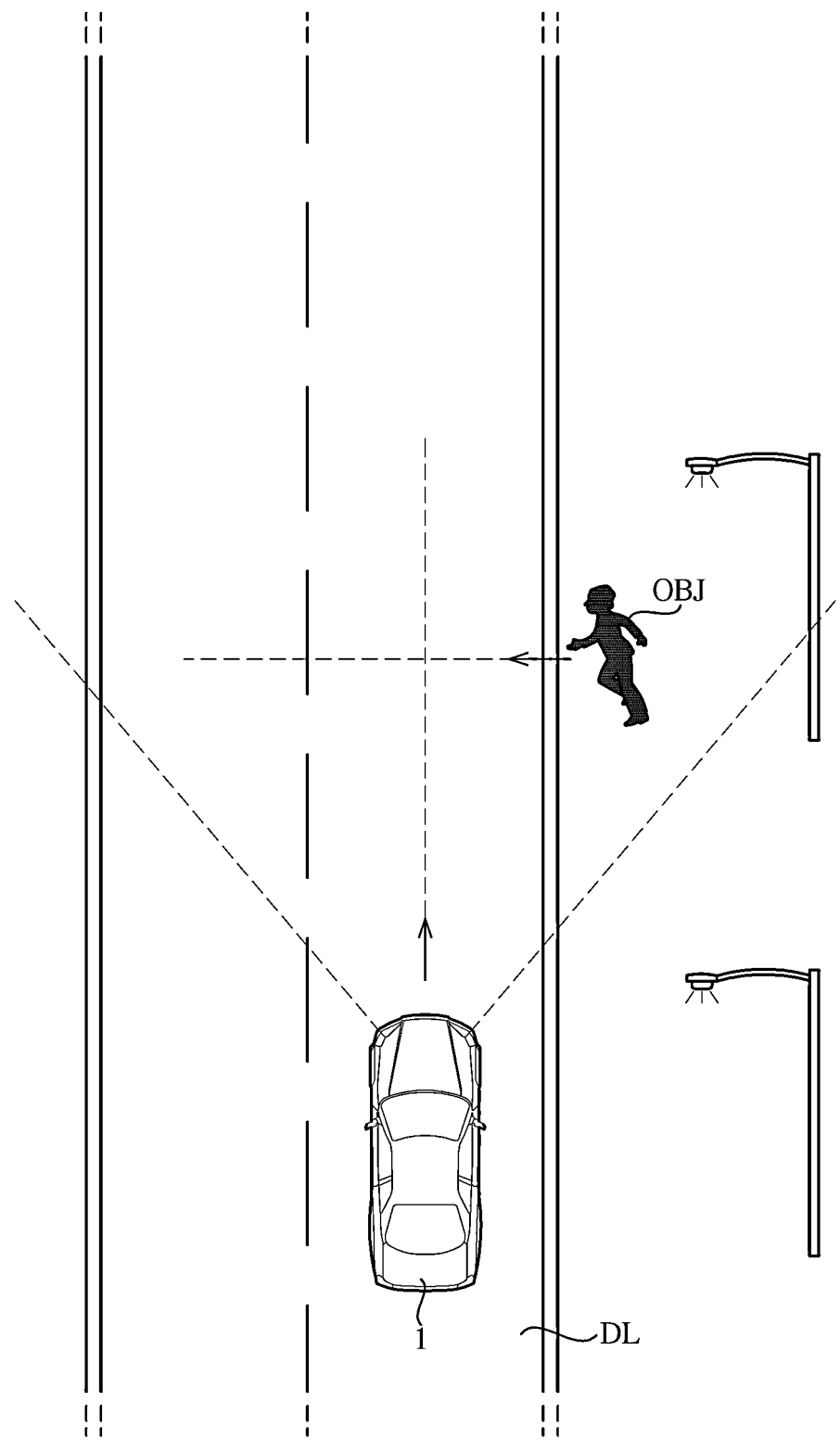

DRIVER ASSISTANCE SYSTEM AND DRIVER ASSISTANCE METHOD

CROSS-REFERENCE TO RELATED APPLICATION

This application is based on and claims priority under 35 U.S.C. § 119 to Korean Patent Application No. 10-2021-0145912, filed on Oct. 28, 2021 in the Korean Intellectual Property Office, the disclosure of which is incorporated herein by reference.

BACKGROUND

1. Technical Field

The disclosure relates to a driver assistance system and a driver assistance method, and more specifically, to a driver assistance system and a driver assistance method that may avoid a collision by performing emergency braking based on an infrared camera even in a low light environment.

2. Background Art

A vehicle is a machine that transports people or cargo by driving vehicle wheels on the road. A vehicle accident may occur due to a failure of a vehicle, a driver's inattentiveness, negligence of another vehicle's driver, or road conditions.

Recently, a variety of advanced driver assistance systems (ADAS) have been developed to provide a driver with driving information to prevent an accident caused by a driver's inattentiveness and improve convenience for autonomous driving.

For example, ADAS such as an autonomous emergency braking (AEB) is equipped on a vehicle.

AEB is a system capable of determining a risk of collision with an oncoming vehicle, a vehicle at intersections or a pedestrian based on information obtained from a camera or a radar sensor provided in a vehicle and assisting in avoiding a collision through emergency braking and steering control.

However, AEB may not accurately identify a pedestrian using a camera sensor in a low light environment, leading to a low collision avoidance performance in a low light environment at night.

SUMMARY

An aspect of the disclosure provides a driver assistance system and a driver assistance method that may avoid a collision by performing emergency braking based on an infrared camera even in a low light environment.

Additional aspects of the disclosure will be set forth in part in the description which follows and, in part, will be obvious from the description, or may be learned by practice of the disclosure.

According to an aspect of the disclosure, there is provided a driver assistance system, including: an infrared camera provided in a vehicle and configured to acquire infrared image data; a radar sensor provided in the vehicle and configured to acquire radar data; and a controller configured to process at least one of the infrared image data or the radar data, wherein the controller is configured to: identify a target object approaching in a lateral direction from an outside of a driving lane of the vehicle, based on at least one of the infrared image data or the radar data; and perform a collision avoidance control based on a similarity between the target object and a pedestrian.

The controller is configured to compare information about the target object and information about a previously identified pedestrian to calculate the similarity between the target object and the pedestrian.

The controller is configured to compare at least one of a lateral velocity, an area, or a color of each of the target object and the previously identified pedestrian to calculate the similarity between the target object and the pedestrian.

The controller is configured to compare information about the target object and pre-stored pedestrian information to calculate the similarity between the target object and the pedestrian.

The controller is configured to perform the collision avoidance control based on full braking, when the similarity between the target object and the pedestrian is greater than or equal to a first threshold value.

The controller is configured to perform the collision avoidance control based on partial braking, when the similarity between the target object and the pedestrian is less than a first threshold value and greater than or equal to a second threshold value smaller than the first threshold value.

The controller is configured to generate a control signal for transmitting a warning signal, when the similarity between the target object and the pedestrian is greater than or equal to a third threshold value.

The controller is configured to identify an object having a lateral velocity greater than or equal to a preset velocity as the target object.

The controller is configured to calculate an estimated arrival time taken for a detected object to reach the driving lane based on a lateral velocity of the detected object, and identify an object whose estimated arrival time is less than or equal to a preset period of time as the target object.

The preset period of time is set differently depending on a radius of curvature of the driving lane of the vehicle.

The controller is configured to calculate a time to collision (TTC) between the vehicle and a detected object based on a longitudinal velocity of the vehicle and a longitudinal velocity of the detected object, and identify an object whose TTC to the vehicle is less than or equal to a preset period of time as the target object.

According to an aspect of the disclosure, there is provided a driver assistance method, including: identifying a target object approaching in a lateral direction from an outside of a driving lane of a vehicle, based on at least one of infrared image data or radar data; and performing a collision avoidance control based on a similarity between the target object and a pedestrian.

The driver assistance method further includes comparing information about the target object and information about a previously identified pedestrian to calculate the similarity between the target object and the pedestrian.

The comparing of the information about the target object and the information about the previously identified pedestrian to calculate the similarity between the target object and the pedestrian includes comparing at least one of a lateral velocity, an area, or a color of each of the target object and the previously identified pedestrian.

The driver assistance method further includes comparing information about the target object and pre-stored pedestrian information to calculate the similarity between the target object and the pedestrian.

The performing of the collision avoidance control based on the similarity between the target object and the pedestrian includes performing the collision avoidance control based on full braking, when the similarity between the target object and the pedestrian is greater than or equal to a first threshold value.

The performing of the collision avoidance control based on the similarity between the target object and the pedestrian includes performing the collision avoidance control based on partial braking, when the similarity between the target object and the pedestrian is less than a first threshold value and greater than or equal to a second threshold value smaller than the first threshold value.

The driver assistance method further includes generating a control signal for transmitting a warning signal, when the similarity between the target object and the pedestrian is greater than or equal to a third threshold value.

The identifying of the target object approaching in the lateral direction from the outside of the driving lane of the vehicle includes identifying an object having a lateral velocity greater than or equal to a preset velocity as the target object.

The identifying of the target object approaching in the lateral direction from the outside of the driving lane of the vehicle includes: calculating an estimated arrival time taken for a detected object to reach the driving lane based on a lateral velocity of the detected object; and identifying an object whose estimated arrival time is less than or equal to a preset period of time as the target object.

The preset period of time is set differently depending on a radius of curvature of the driving lane of the vehicle.

The identifying of the target object approaching in the lateral direction from the outside of the driving lane of the vehicle includes: calculating a TTC between the vehicle and a detected object based on a longitudinal velocity of the vehicle and a longitudinal velocity of the detected object; and identifying an object whose TTC to the vehicle is less than or equal to a preset period of time as the target object.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a control block diagram illustrating a configuration of a vehicle according to an embodiment;

FIG. 2 is a control block diagram illustrating a configuration of a driver assistance system according to an embodiment;

FIG. 3 illustrates an example of detection areas of an infrared camera and a radar of a driver assistance system according to an embodiment;

FIGS. 4A and 4B are diagrams illustrating examples where a driver assistance system detects a pedestrian and an object;

FIG. 5 is a flowchart illustrating a driver assistance method according to an embodiment;

FIG. 6 is a diagram illustrating an example where a driver assistance system according to an embodiment identifies a detected object as a target object;

FIG. 7 is a flowchart illustrating operations of identifying a target object in a driver assistance method according to an embodiment;

FIGS. 8A and 8B are diagrams illustrating examples where a driver assistance system according to an embodiment identifies a target object according to a radius of curvature of a driving lane;

FIG. 9 is a flowchart illustrating operations of performing a collision avoidance control based on a similarity in a driver assistance method according to an embodiment; and FIGS. 10A and 10B are diagrams illustrating examples where a driver assistance system according to an embodiment identifies a pedestrian and a target object.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

In this specification, the term "object" refers to any object which is likely to collide with a vehicle 1, and includes any moving object such as another vehicle, a pedestrian, a cyclist, etc., as well as any stationary object such as a tree, a streetlight, a structure, etc.

In this specification, a "lateral direction" may be a direction vertical to a driving direction of the vehicle 1, and a "longitudinal direction" may be a direction parallel to the driving direction of the vehicle 1.

Hereinafter, an operation principle and embodiments will be described in detail with reference to the accompanying drawings.

FIG. 1 is a control block diagram illustrating a configuration of a vehicle according to an embodiment. According to an embodiment, a vehicle 1 may be a vehicle driven according to a driver's intention or an autonomous vehicle that autonomously travels to a destination.

As shown in FIG. 1, the vehicle 1 may include an engine 10, a transmission 20, a braking device 30, and a steering device 40.

The engine 10 may include a cylinder and a piston, and generate power for driving the vehicle 1. The transmission 20 may include a plurality of gears and transmit the power generated by the engine 10 to vehicle wheels. The braking device 30 may decelerate or stop the vehicle 1 using friction with a brake disc. The steering device 40 may change a driving direction of the vehicle 1.

The vehicle 1 may include a plurality of electronic components. For example, the vehicle 1 may further include an engine management system (EMS) 11, a transmission control unit (TCU) 21, an electronic brake control module (EBCM) 31, an electronic power steering control module (EPS) 41, a body control module (BCM) 51, and a driver assistance system (DAS) 100.

The EMS 11 may control the engine 10 in response to a driver's acceleration intention through an accelerator pedal or a request from the DAS 100. For example, the EMS 11 may control a torque of the engine 10.

The TCU 21 may control the transmission 20 in response to a driver's shift command through a shift lever and/or a driving speed of the vehicle 1. For example, the TCU 21 may adjust a shift ratio from the engine 10 to the vehicle wheels.

The EBCM 31 may control the braking device 30 in response to a driver's braking intention through a brake pedal and/or wheel slip. For example, the EBCM 31 may temporarily release the wheel braking in response to the wheel slip detected when the vehicle 1 is braked (anti-lock brake system (ABS)).

The EBCM 31 may selectively release the wheel braking in response to oversteering and/or understeering detected when steering the vehicle 1 (electronic stability control, ESC).

Also, the EBCM 31 may temporarily brake the wheels in response to the wheel slip detected when driving the vehicle 1 (traction control system, TCS).

The EPS 41 may assist operations of the steering device 40 so that a driver may easily manipulate a steering wheel according to a driver's steering intention. For example, the EPS 41 may assist the operations of the steering device 40 to reduce a steering force during low speed driving or parking and increase a steering force during high speed driving.

The BCM 51 may control operations of electronic components that provide a driver with convenience or secure a driver's safety. For example, the BCM 51 may control a headlamp, wiper, cluster, multi-function switch, a direction indicator, and the like.

The DAS 100 may assist driver's manipulation (driving, braking, steering) of the vehicle 1. For example, the DAS 100 may detect an environment around the vehicle 1 (e.g., another vehicle, pedestrians, lane lines, road signs, etc.) and control driving and/or braking and/or steering of the vehicle 1 in response to the detected environment.

The above-described electronic components may communicate with each other via a vehicle communication network (NT). For example, the above electronic components may transmit and receive data with each other through Ethernet, media oriented systems transport (MOST), FlexRay, controller area network (CAN), local interconnect network (LIN), and the like. That is, the DAS 100 may transmit a driving control signal, a braking control signal, and a steering control signal to the EMS 11, the TCU 21, the EBCM 31 and the EPS 41, respectively, via a vehicle communication network (NT).

Hereinafter, a configuration of the DAS 100 is described in greater detail with reference to FIGS. 2 and 3.

FIG. 2 is a control block diagram illustrating a configuration of the DAS 100 according to an embodiment. FIG. 3 illustrates an example of detection areas of an infrared camera and a radar included in the DAS 100 according to an embodiment.

According to an embodiment, the DAS 100 may include a collision avoidance device for outputting notification information about a collision with an object or avoiding an object in order to prevent the collision with the object.

To this end, the DAS 100 may include an infrared camera 110 which is provided in the vehicle 1 to have a field of view 110*a* facing surroundings of the vehicle 1 and acquires infrared image data, and a radar sensor 102 which is provided in the vehicle 1 and acquires radar data on the surroundings of the vehicle 1.

According to an embodiment, the infrared camera 110 may be provided on a front windshield of the vehicle 1.

According to an embodiment, the infrared camera 110 may photograph the surroundings of the vehicle 1 and acquire infrared image data on the surroundings of the vehicle 1. The infrared image data on the surroundings of the vehicle 1 may include location information about at least one of another vehicle, pedestrians, cyclists, lane lines, curbs, guardrails, street trees, streetlights, etc.

The infrared camera 110 may include a plurality of lens and infrared image sensors. The infrared image sensor may include a plurality of photodiodes converting light, particularly, light in an infrared region, into an electrical signal, and the plurality of photodiodes may be arranged in a two-dimensional (2D) matrix.

The infrared camera 110 may be electrically connected to a controller 140. For example, the infrared camera 110 may be connected to the controller 140 via a vehicle communication network (NT), a hard wire, or a printed circuit board (PCB).

The infrared camera 110 may transmit the infrared image data on the surroundings of the vehicle 1 to the controller 140.

The radar sensor 102 may include a front radar 120 having a field of view facing a front of the vehicle 1 and a plurality of corner radars 130 having fields of sensing 131*a*, 132*a*, 133*a* and 134*a* around the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an object.

The front radar 120 may acquire front radar data from the transmission wave transmitted by the transmission antenna and the reflected wave received by the receiving antenna.

The front radar data may include location information and speed information about an object located in front of the vehicle 1. In this instance, the object may include at least one of other vehicles, pedestrians, cyclists, curbs, guardrails, street trees, streetlights, and the like.

The front radar 120 may calculate a relative distance to an object based on a phase difference (or a time difference) between the transmission wave and the reflected wave, and calculate a relative speed of the object based on a frequency difference between the transmission wave and the reflected wave.

For example, the front radar 120 may be connected to the controller 140 via a vehicle communication network (NT), a hard wire, or a PCB. The front radar 120 may transmit the front radar data to the controller 140.

The plurality of corner radars 130 may include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1. An operation principle of the plurality of corner radars 130 is the same as that of the front radar 120 described above.

The first corner radar 131 may be provided on a right side of a front bumper of the vehicle 1 and have the field of sensing 131*a* facing the front right side of the vehicle 1. The second corner radar 132 may be provided on a left side of the front bumper of the vehicle 1 and have the field of sensing 132*a* facing the front left side of the vehicle 1. The third corner radar 133 may be provided on a right side of a rear bumper of the vehicle 1 and have the field of sensing 133*a* facing the rear right side of the vehicle 1. The fourth corner radar 134 may be provided on a left side of the rear bumper of the vehicle 1 and have the field of sensing 134*a* facing the rear left side of the vehicle 1.

Each of the first, second, third and fourth corner radars 131, 132, 133 and 134 may be connected to the controller 140 via a vehicle communication network (NT), a hard wire, or a PCB, and transmit first, second, third and fourth corner radar data to the controller 140, respectively.

According to an embodiment, the radar sensor 102 may be replaced by or combined with a light detection and ranging (lidar) sensor which is a non-contact distance detection sensor using a laser radar principle.

According to an embodiment, the controller 140 may process at least one of the infrared image data or the radar data, and include a processor 141 and a memory 142.

The processor 141 may process the infrared image data of the infrared camera 110, the front radar data of the front radar 120 and the corner radar data of the plurality of corner radars 130, and generate a braking signal for controlling a braking system 32 and a steering signal for controlling a steering system 42.

That is, the processor 141 may be connected to at least one of the infrared camera 110 or the radar sensor 102, thereby detecting an object and performing a collision avoidance control of the vehicle 1. In this instance, the collision avoidance control may refer to generating the braking signal for controlling the braking system 32 and the steering signal for controlling the steering system 42 to control the vehicle 1.

To this end, the processor 141 may include an image signal processor for processing the infrared image data of the infrared camera 110 and/or a digital signal processor for processing the radar data of the radars 120 and 130, and/or a micro control unit (MCU) for generating the braking signal and the steering signal.

The processor 141 may detect objects (e.g., other vehicles, pedestrians, cyclists, structures, etc.) located in front of the vehicle 1, based on the infrared image data of the infrared camera 110 and the front radar data of the front radar 120.

Specifically, based on the front radar data of the front radar 120, the processor 141 may acquire location information (distance and direction) and speed information (relative speed) of the objects in front of the vehicle 1. Also, based on the infrared image data of the infrared camera 110, the processor 141 may acquire location information (direction) and type information (e.g., whether the front object is another vehicle, a pedestrian, a cyclist, a curb, a guardrail, a street tree, streetlight, or the like) of the objects in front of the vehicle 1.

In addition, the processor 141 may match the objects detected based on the infrared image data with the objects detected based on the front radar data, and based on results of matching, acquire the type information, location information, and speed information of the objects in front of the vehicle 1.

Based on the type information, the location information, and the speed information of the front objects, the processor 141 may calculate a collision avoidance path to avoid a collision with the front object.

For instance, the processor 141 may identify a target object OBJT approaching in a lateral direction from an outside of a driving lane DL of the vehicle 1, and calculate a collision avoidance path for avoiding a collision between the vehicle 1 and the target object OBJT. Also, the processor 141 may store the collision avoidance path for avoiding the collision with the target object OBJT and information about the target object OBJT in a memory 142 or transmit to a storage 150.

In addition, when a collision between the vehicle 1 and an object is likely to occur, the processor 141 may generate a control signal for transmitting a warning signal and transmit to a notification module 160.

The memory 142 may store a program and/or data for the processor 141 to process the infrared image data, a program and/or data for the processor 141 to process the radar data, and a program and/or data for the processor 141 to generate a braking signal and/or a steering signal. Also, the memory 142 may store the HD map.

The memory 142 may temporarily store the infrared image data received from the infrared camera 110 and/or the radar data received from the radars 120 and 130, and also temporarily store a processing result of the infrared image data and/or the radar data by the processor 141. For example, the memory 142 may temporarily store the information about the target object OBJT, which approaches in a lateral direction from the outside of the driving lane DL of the vehicle 1, and the collision avoidance path for avoiding the collision with the target object OBJT.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The storage 150 may receive and store the information about the target object OBJT and the collision avoidance path calculated to avoid the collision with the target object OBJT.

Specifically, the collision avoidance path may refer to control logic for performing a collision avoidance control of the vehicle 1 and include both steering control amount and braking control amount of the vehicle 1 for collision avoidance.

The storage 150 may be implemented as a non-volatile memory device such as a cache, a read only memory (ROM), a programmable read only memory (PROM), an erasable programmable read only memory (EPROM), an electrically erasable programmable read only memory (EEPROM), a flash memory, and the like, a volatile memory device such as a random access memory (RAM), or a storage medium such as a hard disk drive (HDD), a compact disc read only memory (CD-ROM), without being limited thereto.

The storage 150 may be a memory implemented as a chip separate from the processor 141 described above in connection with the controller 140, or implemented as a single chip integrated with the processor 141.

The notification module 160 may output a warning signal to a user in response to a control signal of the controller 140.

To this end, the notification module 160 may include a sound outputter 161 including a speaker that outputs a warning sound for avoiding a collision with an object according to the control signal of the controller 140, and a display 162 that outputs a warning image for avoiding a collision with an object according to the control signal of the controller 140.

Hereinafter, collision avoidance control operations using the constituent components of the DAS 100 are described with reference to FIGS. 4 to 10.

FIGS. 4A and 4B are diagrams illustrating examples where the DAS 100 detects a pedestrian and an object.

As shown in FIG. 4A, an existing DAS detects objects PD1, PD2 and TR1 based on at least one of image data or radar data. The DAS identifies a risk of collision according to types (pedestrian, tree) and movement of the detected objects and performs a collision avoidance control for collision avoidance. For example, in FIG. 4A, the DAS may detect the pedestrian PD1 moving toward a driving lane DL where the vehicle 1 is travelling, and generate a braking control signal or a steering control signal to avoid a collision with the pedestrian PD1.

Meanwhile, as shown in FIG. 4B, in a low light environment at night, shapes of objects are unlikely to be able to be identified from image data. Even when approximately half of a shape of an object OBJ1 is identified by a headlight of the vehicle 1, the other half of the object OBJ1 is unable to be identified, and thus the object OBJ1 may not be identified. As such, an existing object identification method may not detect an object or erroneously identify an object, causing unnecessary braking.

When acquiring infrared image data by including the infrared camera 110 as shown in FIG. 2, higher identification performance may be obtained compared to a general camera. However, in a low light environment of 1 lx or higher, a shape may not be fully identified even through the infrared image data. Accordingly, an object identification method for collision avoidance control is required, aside from a shape-based object identification.

FIG. 5 is a flowchart illustrating a driver assistance method according to an embodiment.

Referring to FIG. 5, the infrared camera 110 may acquire infrared image data on surroundings of the vehicle 1, and the radar sensor 102 may acquire radar data on surroundings of the vehicle 1. Also, the controller 140 may receive at least one of the infrared image data on the surroundings of the vehicle 1 or the radar data on the surroundings of the vehicle 1 (400).

Based on at least one of the received infrared image data on the surroundings of the vehicle 1 or the received radar data on the surroundings of the vehicle 1, the controller 140 may identify a target object OBJT approaching in a lateral direction from an outside of a driving lane DL of the vehicle 1 (500). In this instance, the target object OBJT may refer to another vehicle, a pedestrian or a cyclist moving in a lateral direction.

As shown in FIG. 6, among objects OBJ1 and OBJ2 detected from at least one of the infrared image data or the radar data, the controller 140 may recognize, as the target object OBJT, only the object OBJ1 having a lateral velocity greater than or equal to a preset velocity, whose estimated arrival time to the driving lane DL is less than or equal to a preset period of time, and whose time to collision (TTC) to the vehicle 1 is less than or equal to a preset period of time.

Detailed operations for the controller 140 to identify a target object OBJT approaching in a lateral direction from an outside of a driving lane DL of the vehicle 1 are described with reference to FIG. 7.

As shown in FIG. 7, the controller 140 receives at least one of infrared image data or radar data and detects an object (510).

Among objects detected from at least one of the infrared image data or the radar data, the controller 140 may identify an object having a lateral velocity greater than or equal to a preset velocity as a target object OBJT (520) (550). For example, the controller 140 may identify an object having a lateral velocity greater than or equal to 1 m/s as the target object OBJT, because the object having the lateral velocity less than the preset velocity is unlikely to collide with the vehicle 1.

Also, the controller 140 may calculate an estimated arrival time taken for the detected object to reach the driving lane DL where the vehicle 1 is travelling, based on a lateral velocity of the detected object (530), and identify an object whose estimated arrival time is less than or equal to a preset period of time as the target object OBJT (535) (550). For example, the controller 140 may identify an object whose estimated arrival time to the driving lane DL is less than 5 seconds as the target object OBJT, because an object having a velocity greater than or equal to a preset velocity but whose estimated arrival time to the driving lane DL of the vehicle 1 is long is unlikely to collide with the vehicle 1.

Meanwhile, the controller 140 may identify the target object OBJT according to an estimated arrival time set differently depending on a radius of curvature of the driving lane DL of the vehicle 1.

FIGS. 8A and 8B are diagrams illustrating examples where the DAS 100 according to an embodiment identifies a target object according to a radius of curvature R of a driving lane DL.

In FIG. 8A, the vehicle 1 is travelling in a driving lane DL which is a nearly straight line (R>2000 m). In this instance, the controller 140 may calculate an estimated arrival time based on a lateral velocity $V_{obj1}$ of a detected object OBJ1 and a distance D1 to the driving lane DL. In this instance, when the estimated arrival time of the object OBJ1 is less than a time set according to the radius of curvature R of the driving lane DL (e.g., 5 seconds in R>2000 m), the controller 140 may identify the object OBJ1 as a target object OBJT. When the estimated arrival time of the object OBJ1 exceeds 5 seconds, the controller 140 may not identify the object OBJ1 as the target object OBJT.

In FIG. 8B, the vehicle 1 is travelling in a driving lane DL with a radius of curvature R of 300 m. In this instance, the controller 140 may calculate an estimated arrival time based on a lateral velocity $V_{obj3}$ of a detected object OBJ3 and a distance D3 to the driving lane DL. In this instance, when the estimated arrival time of the object OBJ3 is less than a time set according to the radius of curvature R of the driving lane DL (e.g., 1 second in 200 m≤R<500 m), the controller 140 may identify the object OBJ3 as a target object OBJT. When the estimated arrival time of the object OBJ3 exceeds 1 second, the controller 140 may not identify the object OBJ3 as the target object OBJT.

Estimated arrival time references set according to the radius of curvature R of the driving lane DL, as set out in the table 1 below, are stored in the controller 140, and the controller 140 may identify a target object OBJT according to the set estimated arrival time references.

TABLE 1

| | Radius of curvature (R) | | | | | |
|---|---|---|---|---|---|---|
| | R < 200 m | 200 m ≤ R < 500 m | 500 m ≤ R < 1000 m | 1000 m ≤ R < 1500 m | 1500 m ≤ R < 2000 m | 2000 m ≤ R |
| Estimated arrival time | 0 s | 1 s | 2 s | 3 s | 4 s | 5 s |

In this instance, when the estimated arrival time is less than 0 second, it may indicate that an object has already reached the driving lane DL. When the radius of curvature R of the driving lane DL is less than 200 m, a vehicle is highly likely to be moving slowly. Accordingly, except when an object has already reached the driving lane DL, the controller 140 may not identify the object as the target object OBJT.

Also, based on a longitudinal velocity of the vehicle 1 and a longitudinal velocity of the object detected from at least one of the infrared image data or the radar data, the controller 140 may calculate a TTC between the vehicle 1 and the detected object (540), and identify an object whose TTC to the vehicle 1 is less than or equal to a preset period of time as the target object OBJT (545) (550). For example, the controller 140 may identify an object whose TTC to the vehicle 1 is less than 5 seconds as the target object OBJT, because an object whose TTC to the vehicle 1 is long based on a longitudinal direction is unlikely to collide with the vehicle 1.

In order to accurately identify the target object OBJT which is moving in a lateral direction and is highly likely to collide with the vehicle 1, the controller 140 may identify, as the target object OBJT, only the object having a lateral velocity greater than or equal to a preset velocity, whose estimated arrival time to the driving lane DL is less than or equal to a preset period of time, and whose TTC to the vehicle 1 is less than or equal to a preset period of time, among objects detected from at least one of the infrared image data or the radar data. Accordingly, a stability of overall collision avoidance control may be secured.

Afterwards, the controller 140 may calculate a collision avoidance path to avoid a collision between the vehicle 1 and the target object OBJT and perform a collision avoidance control (600). In this instance, the collision avoidance path may include control logic for performing a collision avoidance control of the vehicle 1.

The controller 140 may perform collision avoidance control based on a similarity between the target object OBJT and a pedestrian.

FIG. 9 is a flowchart illustrating operations of performing a collision avoidance control based on a similarity in a driver assistance method according to an embodiment.

In a low light environment at night, an object is not easily identified, and thus whether an object detected by infrared image data or radar data is likely to collide with the vehicle 1 may not be easily determined. Accordingly, the controller 140 compares a similarity between a target object and a pedestrian and performs a collision avoidance control according to the similarity.

The controller 140 may acquire information about a target object OBJT (610). In this instance, the information about the target object OBJT may include information about at least one of a lateral velocity, an area, or a color of the target object OBJT.

Even at night, when lighting is sufficient or when both the vehicle and object are stopped, the controller 140 may determine whether a detected object is a pedestrian. However, when entering an area with weak lighting or when the vehicle 1 is moving at high speed, whether the detected object is a pedestrian may not be easily determined. Accordingly, the controller 140 is required to determine whether the detected target object OBJT is the same as a previously identified pedestrian to perform a collision avoidance control. To this end, the controller 140 calculates a similarity between the target object OBJT and the pedestrian (620).

FIGS. 10A and 10B are diagrams illustrating examples where the DAS 100 according to an embodiment identifies a pedestrian and a target object.

Referring to FIG. 10A, a pedestrian PD is under a streetlight. In this case, the controller 140 may detect the pedestrian PD as an object based on infrared image data and radar data, and identify that the detected object is a pedestrian.

Referring to FIG. 10B, when a pedestrian moves away from a streetlight, the controller 140 may detect an object and identify the object as a target object OBJT, but may not determine that the detected object is a pedestrian. In this instance, the controller 140 may compare information about the target object OBJT with information about the pedestrian PD of FIG. 10A, thereby calculating a similarity.

When the target object OBJT is identified (550), the controller 140 may compare information about the identified target object OBJT with information about the previously identified pedestrian PD stored in the storage 150 and/or the memory 142, thereby calculating a similarity between the target object OBJT and the pedestrian.

For example, the controller 140 may compare at least one of a lateral velocity, an area, or a color of each of the target object OBJT and the pedestrian, thereby calculating the similarity between the target object OBJT and the previously identified pedestrian PD. Here, the color may refer to a heat reflectance according to a color in the infrared image data.

Meanwhile, even when a previously identified pedestrian does not exist, the controller 140 may detect and identify a target object OBJT. As such, even when the previously identified pedestrian PD to compare similarity does not exist, the controller 140 may compare the information about the target object OBJT with pre-stored pedestrian information to calculate the similarity between the target object OBJT and the pedestrian. For example, the pre-stored pedestrian information may include information such as a lateral velocity of 3 to 8 km/h and an area of 0.316 m$^2$.

The controller 140 may calculate the similarity by comparing the information about the target object OBJT with the information about the previously identified pedestrian or with the pre-stored pedestrian information, and perform a collision avoidance control based on the calculated similarity.

For example, when the similarity between the target object OBJT and the pedestrian is greater than or equal to a first threshold value, the controller 140 may perform a collision avoidance control based on full braking. The full braking may refer to braking the vehicle 1 with the amount of braking of 80% or more of the maximum amount of braking of the braking device 30.

When the similarity between the target object OBJT and the pedestrian is less than the first threshold value and greater than or equal to a second threshold value which is smaller than the first threshold value, the controller 140 may perform a collision avoidance control based on partial braking. The partial braking may refer to braking the vehicle 1 with the amount of braking of less than 80% of the maximum amount of braking of the braking device 30.

Also, when the similarity between the target object OBJT and the pedestrian is greater than or equal to a third threshold value smaller than the second threshold value, the controller 140 may generate a control signal for transmitting a warning signal and transmit to the notification module 160. In other words, when the similarity is greater than or equal to the third threshold value, the controller 140 may notify a driver of a risk of collision to prevent collision.

That is, the controller 140 calculates the similarity between the target object OBJT and the pedestrian (620), and when the similarity between the target object OBJT and the pedestrian is greater than or equal to the third threshold value (Yes in operation 630), generates the control signal for transmitting the warning signal (640).

When the similarity between the target object OBJT and the pedestrian is less than the third threshold value (No in operation 630), the controller 140 allows the vehicle 1 to drive normally without performing a collision avoidance control (671).

When the similarity between the target object OBJT and the pedestrian is greater than or equal to the first threshold value (Yes in operation 650), the controller 140 performs the collision avoidance control based on full braking (673).

When the similarity between the target object OBJT and the pedestrian is less than the first threshold value and greater than or equal to the second threshold value (Yes in operation 660), the controller 140 performs the collision avoidance control based on partial braking (672).

When the similarity between the target object OBJT and the pedestrian is less than the second threshold value (No in operation 660), the controller 140 allows the vehicle 1 to drive normally without performing a collision avoidance control (671).

According to the embodiments of the disclosure, even in a low light environment, the DAS 100 and the driver assistance method may identify an object approaching in a lateral direction as a target object based on infrared image data and radar data, thereby performing a collision avoidance control.

Also, by performing a collision avoidance control according to a similarity between an identified target object and a pedestrian, the collision avoidance control may be prevented from being unnecessarily performed and a reliability of a collision avoidance control system may be secured.

Although a collision avoidance control for a pedestrian having a high need for safety in a low light environment has been described in the above, any object which are at risk of collision such as another vehicle, a cyclist, wild animals and the like may also be included in an object of collision avoidance control.

As is apparent from the above, according to the embodiments of the disclosure, the driver assistance system and the driver assistance method can perform a collision avoidance control using an infrared camera and a radar sensor which are less affected by a low light condition.

Also, the driver assistance system and the driver assistance method can keep tracking a pedestrian approaching a lane in which a vehicle travels, thereby performing a quick control to avoid a collision and reduce a risk of collision.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A driver assistance system, comprising:
an infrared camera provided in a vehicle and configured to acquire infrared image data;
a radar sensor provided in the vehicle and configured to acquire radar data; and
a controller configured to process at least one of the infrared image data or the radar data,
wherein the controller is configured to:
identify a target object approaching in a lateral direction from an outside of a driving lane of the vehicle, based on at least one of the infrared image data or the radar data;
perform a collision avoidance control based on a similarity between the target object and a pedestrian; and
compare a heat reflectance according to a color in the infrared image data of the target object and the pedestrian to calculate the similarity between the target object and the pedestrian.

2. The driver assistance system of claim 1, wherein the controller is configured to compare information about the target object and information about a previously identified pedestrian to calculate the similarity between the target object and the pedestrian.

3. The driver assistance system of claim 2, wherein the controller is configured to further compare at least one of a lateral velocity, an area, or a color of each of the target object and the previously identified pedestrian to calculate the similarity between the target object and the pedestrian.

4. The driver assistance system of claim 1, wherein the controller is configured to compare information about the target object and pre-stored pedestrian information to calculate the similarity between the target object and the pedestrian.

5. The driver assistance system of claim 1, wherein the controller is configured to perform the collision avoidance control based on full braking, when the similarity between the target object and the pedestrian is greater than or equal to a first threshold value.

6. The driver assistance system of claim 1, wherein the controller is configured to perform the collision avoidance control based on partial braking, when the similarity between the target object and the pedestrian is less than a first threshold value and greater than or equal to a second threshold value smaller than the first threshold value.

7. The driver assistance system of claim 1, wherein the controller is configured to generate a control signal for transmitting a warning signal, when the similarity between the target object and the pedestrian is greater than or equal to a third threshold value.

8. The driver assistance system of claim 1, wherein the controller is configured to identify an object having a lateral velocity greater than or equal to a preset velocity as the target object.

9. The driver assistance system of claim 1, wherein the controller is configured to calculate an estimated arrival time taken for a detected object to reach the driving lane based on a lateral velocity of the detected object, and identify an object whose estimated arrival time is less than or equal to a preset period of time as the target object.

10. The driver assistance system of claim 9, wherein the preset period of time is set differently depending on a radius of curvature of the driving lane of the vehicle.

11. The driver assistance system of claim 1, wherein the controller is configured to calculate a time to collision (TTC) between the vehicle and a detected object based on a longitudinal velocity of the vehicle and a longitudinal velocity of the detected object, and identify an object whose TTC to the vehicle is less than or equal to a preset period of time as the target object.

12. A driver assistance method, comprising:
identifying a target object approaching in a lateral direction from an outside of a driving lane of a vehicle, based on at least one of infrared image data or radar data;
performing a collision avoidance control based on a similarity between the target object and a pedestrian; and
compare a heat reflectance according to a color in the infrared image data of the target object and the pedestrian to calculate the similarity between the target object and the pedestrian.

13. The driver assistance method of claim 12, further comprising:
comparing information about the target object and information about a previously identified pedestrian to calculate the similarity between the target object and the pedestrian.

14. The driver assistance method of claim 13, wherein the comparing of the information about the target object and the information about the previously identified pedestrian to calculate the similarity between the target object and the pedestrian comprises further comparing at least one of a lateral velocity, an area, or a color of each of the target object and the previously identified pedestrian.

15. The driver assistance method of claim 12, further comprising:
comparing information about the target object and pre-stored pedestrian information to calculate the similarity between the target object and the pedestrian.

16. The driver assistance method of claim 12, wherein the performing of the collision avoidance control based on the similarity between the target object and the pedestrian comprises performing the collision avoidance control based on full braking, when the similarity between the target object and the pedestrian is greater than or equal to a first threshold value.

17. The driver assistance method of claim 12, wherein the performing of the collision avoidance control based on the similarity between the target object and the pedestrian comprises performing the collision avoidance control based on partial braking, when the similarity between the target object and the pedestrian is less than a first threshold value and greater than or equal to a second threshold value smaller than the first threshold value.

18. The driver assistance method of claim 12, further comprising:
generating a control signal for transmitting a warning signal, when the similarity between the target object and the pedestrian is greater than or equal to a third threshold value.

19. The driver assistance method of claim 12, wherein the identifying of the target object approaching in the lateral direction from the outside of the driving lane of the vehicle comprises identifying an object having a lateral velocity greater than or equal to a preset velocity as the target object.

20. The driver assistance method of claim 12, wherein the identifying of the target object approaching in the lateral direction from the outside of the driving lane of the vehicle comprises:
calculating an estimated arrival time taken for a detected object to reach the driving lane based on a lateral velocity of the detected object; and
identifying an object whose estimated arrival time is less than or equal to a preset period of time as the target object.

21. The driver assistance method of claim 20, wherein the preset period of time is set differently depending on a radius of curvature of the driving lane of the vehicle.

22. The driver assistance method of claim 12, wherein the identifying of the target object approaching in the lateral direction from the outside of the driving lane of the vehicle comprises:
calculating a TTC between the vehicle and a detected object based on a longitudinal velocity of the vehicle and a longitudinal velocity of the detected object; and
identifying an object whose TTC to the vehicle is less than or equal to a preset period of time as the target object.

* * * * *